United States Patent
Kobayashi et al.

(10) Patent No.: US 6,672,146 B1
(45) Date of Patent: Jan. 6, 2004

(54) THERMAL RESISTOR TYPE AIR FLOW MEASURING APPARATUS

(75) Inventors: Chihiro Kobayashi, Naka-machi (JP); Shinya Igarashi, Naka-machi (JP); Masayuki Kozawa, Hitachinaka (JP); Atsushi Kanke, Hitachi (JP)

(73) Assignees: Hitachi, Ltd., Tokyo; Hitachi Car Engineering Co., Ltd., Hitachinaka (JP)

(*) Notice: Subject to any disclaimer, the term of this patent is extended or adjusted under 35 U.S.C. 154(b) by 149 days.

(21) Appl. No.: 09/632,850

(22) Filed: Aug. 4, 2000

Related U.S. Application Data

(63) Continuation of application No. 09/151,763, filed on Sep. 11, 1998, now abandoned.

(30) Foreign Application Priority Data

Sep. 11, 1997 (JP) .............................................. 9-246451

(51) Int. Cl.[7] .............................................. G01M 19/00
(52) U.S. Cl. ....................................................... 73/118.2
(58) Field of Search ............................. 73/202.5, 118.2, 73/204.22, 202

(56) References Cited

U.S. PATENT DOCUMENTS

| | | | | |
|---|---|---|---|---|
| 4,571,990 A | * | 2/1986 | Hönig | 73/118 |
| 5,381,691 A | * | 1/1995 | Miyazaki et al. | 73/202.5 |
| 5,461,910 A | * | 10/1995 | Hodson et al. | 73/202.5 |
| 5,467,648 A | * | 11/1995 | Igarashi et al. | 73/202.5 |
| 5,587,520 A | * | 12/1996 | Rhodes | 73/202.5 |
| 5,631,415 A | * | 5/1997 | Igarashi et al. | 73/202.5 |
| 5,635,635 A | * | 6/1997 | Tsukada et al. | 73/118.2 |

FOREIGN PATENT DOCUMENTS

| | | |
|---|---|---|
| DE | 33 04 710 A1 | 8/1984 |
| DE | 44 40 639 A1 | 5/1995 |
| DE | 196 28 235 A1 | 1/1997 |
| EP | 0 313 089 | 4/1989 |
| EP | 88117604.4 * | 4/1989 |
| JP | 59-17371 | 4/1984 |
| JP | 2-1518 | 1/1990 |
| JP | 8-105781 | 4/1996 |
| JP | 8-219839 | 8/1996 |

* cited by examiner

Primary Examiner—Edward Lefkowitz
Assistant Examiner—Maurice Stevens
(74) Attorney, Agent, or Firm—Crowell & Moring LLP

(57) ABSTRACT

To correct properly the error of the thermal resistor type air flow measuring apparatus caused by the pulsation in the intake pipe in detecting the air flow of the internal combustion engine, a thermal resistor is placed in a passage inside the auxiliary air passage into which the reverse flow hardly flows directly and the error caused by the reverse flow is prevented. The existence of the reverse flow is judged by the ratio of the amplitude to the mean value using the maximum value, the minimum value and the mean value of the forward air flow waveform, and the error caused by the increase of the forward air flow is corrected.

21 Claims, 11 Drawing Sheets

THERMAL RESISTOR TYPE AIR FLOW MEASURING APPARATUS

This application is a continuation of application Ser. No. 09/151,763, filed Sep. 11, 1998 now abandoned.

BACKGROUND OF THE INVENTION

The present invention relates to an error correcting method in an air flow measuring apparatus for measuring the air flow based on the radiation amount from the hot wire to the air using the hot wire, specifically to a measurement error correcting method for the measurement error caused by the intake air pulsation, especially by the reverse flow, when measuring the air flow to be taken into the internal combustion engine of the automotive vehicle.

As for the measurement error correcting method of the thermal resistor type air flow measuring apparatus in the pulsating operation area, a method using a correction map based on the throttle valve opening ($\alpha$) and the engine speed (N) as shown in Japanese Patent Application Laid-Open No. 8-105781 (1996) is generally known as prior art.

As for the method for reducing the detection error caused by the reverse flow by using the auxiliary air passage used in the thermal resistor type air flow measuring apparatus, Japanese Patent Publication No. 2-1518 (1990) is known. In this prior art, the influence of the reverse flow is reduced by means that a thermal resistor is placed in the auxiliary air passage having a bend, and that the reverse flow from the engine to the air cleaner is not at least directly applied to the thermal resistor.

In addition, as for the prior art most related to the present invention, Japanese Patent Publication No. 59-17371 (1984) is known. In this prior art, AC component of the output voltage signal from the thermal resistor type air flow measuring apparatus is extracted by the analog circuit and used for the error correction, and the negative error (so to say binary phenomena) in the detected air flow due to the non-linearity and the response delay of the thermal resistor is aimed to be increased.

It is difficult for the thermal resistor used as the air flow detecting device to detect directly the direction of the air flow due to its structural characteristic. For this reason, when the reverse flow occurs, the thermal resistor detects the reverse flow as the forward flow and this erroneous detection is reflected onto the detection error.

The air flow flowing into the intake air pipe of the engine is pulsated in responsive to the open and close of the intake air valve. The quantity of this pulsation is small when the throttle valve opens relatively with small amount, and increases as the throttle valve opens up to the full gate opening.

This phenomena is described by referring to FIG. 15. As the throttle valve is opened gradually while the engine speed maintained to be constant, in connection with the increase in the intake air flow velocity (air flow), the pulsation amplitude in the intake air pipe increases gradually, and the output of the thermal resistor indicates the value having a negative error due to its non-linearity and response delay when the pulsation amplitude reaches a certain large value. This phenomena is so-called binary phenomena. FIG. 13 shows a generation and development process of the binary phenomena. As the pulsation amplitude becomes much larger, the air flow in the intake air pipe contains a reverse flow. However, owing to the structural characteristic, it is difficult for the thermal resistor used as the air flow detecting device to detect directly the direction of the air flow, and hence, both the forward flow and the reverse flow are detected simply as a flow. Therefore, the thermal resistor detects the reverse flow, if any, as a flow, and consequently, a positive error is included in the detected signal.

For those reasons, in case of using the thermal resistor type air flow measuring apparatus, it is required to perform any correction operation when the reverse flow occurs.

It may not be simply concluded that the detection error due to the reverse flow is used for compensating only the reverse flow from the engine to the air cleaner side. This is because the reverse flow contributes again to the increase in the forward flow. FIG. 14 shows experimental results by the inventors. FIG. 14 shows the measurement result of the forward flow and the reverse flow in the air flow in the intake air pipe by using a special method. The engine is at the state that the reverse flow occurs, when the intake negative pressure reaches about 10 mmHg. In this case, in spite of measuring separately the forward flow and the reverse flow, the output signal for the forward flow also increases in the same manner as the reverse flow does. This is because the reverse flow contributes to the increase in the forward flow.

In order to prevent this phenomena, it is required to measure the forward flow component and the reverse flow component separately, and to subtract the reverse flow contribution from the forward flow component. However, it is required to make the response of the thermal resistor fast enough. In order to establish such a high response, it is required to make the size of the thermal resistor smaller by reducing its thickness in order to reduce the heat content of the thermal resistor. To make the size of the thermal resistor smaller leads not only to the reduction of the mechanical strength of the thermal resistor but also to the reduction of the anti taint damage and even the reduction of the output noise characteristic due to the higher response capability, and thus, the accuracy in calculating the mean air flow may be reduced.

SUMMARY OF THE INVENTION

In order to solve the above problems, a thermal resistor type air flow measuring apparatus of the present invention has an auxiliary air passage placed in an intake air passage of an internal combustion engine and having at least one or more bend, and a thermal resistor placed in said auxiliary air passage. The measuring apparatus further includes a judging means for judging an existence of a reverse flow in said intake air passage based on a maximum value and a minimum value of an air flow signal value obtained said thermal resistor.

By referring to FIG. 2, a concrete view of the means for solving the problem is described. FIG. 2 shows the relation between the air flow (AIRFLOW) on the vertical axis and the negative pressure (BOOST) in which the maximum value (Qmax) and the minimum value (Qmin) are measured from the detection waveform of the thermal resistor by changing the intake negative pressure (BOOST) by opening gradually the throttle valve while keeping the engine speed constant with which the negative pressure occurs. In FIG. 2, the pulsation amplitude (Qmax−Qmin) and the mean value (Qmax+Qmin)/2, and the pulsation amplitude divided by the mean value ((Qmax−Qmin)/(Qmax+Qmin)/2) are also shown. In FIG. 2, the reverse flow occurs when the negative pressure reaches about −10 mmHg and the positive error arises after this negative pressure value.

In the observation of the maximum value and the minimum value, in case that the mean value increases due to the reverse flow, it is proved that the change in the minimum value is small but the maximum value increases very much for the change in the intake negative pressure. In addition, in the observation of the pulsation amplitude divided by the mean value, its value increases as the pulsation amplitude increases. By defining a threshold value for the value of the division of the pulsation amplitude by the mean value, it can be judged that the reverse flow does not occur if the value of the division of the pulsation amplitude by the mean value is smaller than the threshold value, and that the reverse flow occurs if the value of the division of the pulsation amplitude by the mean value is larger than the threshold value.

And furthermore, in case that the reverse flow occurs, the larger the value of the division of the pulsation amplitude by the mean value, the larger the detection error. This relation is shown in FIG. 3. FIG. 3 includes the value of the division of the pulsation amplitude by the mean value, (($Q_{max}-Q_{min}$)/($Q_{max}+Q_{min}$)/2), on the vertical axis and the error of the detected value to the actual value on the vertical axis. As the relation between the value of the division of the pulsation amplitude by the mean value and the error has a monotone increasing property, this relation and the maximum value and the minimum value of the detected waveform of the thermal resistor can estimates the existence of the reverse flow as well as the quantity of the reverse flow.

The reason why the layout of the thermal resistor in the auxiliary air passage having a bend is to prevent the deformation of the detected waveform of the thermal resistor due to the reverse flow. The result of the similar experiments to FIG. 2 in which the thermal resistor is shown in FIG. 9 and its output waveform is shown in FIG. 8. The major difference from the result shown in FIG. 2 is that the minimum value of the detected waveform increases as the reverse flow increases. This is because the thermal resistor detects straightforwardly the reverse flow and the waveform is folded and deformed extremely. In the area where the reverse flow occurs, the pulsation amplitude keeps a constant value independent of the change in the reverse flow, and the value of the division of the pulsation amplitude by the mean value decreases as the reverse flow increases. Thus, the monotone increase relation shown in FIG. 3 can not be obtained and it is difficult to judge the existence of the reverse flow and estimate the quantity of the reverse flow.

The reason why the detected value from the thermal resistor is converted from the output voltage to the air flow is to obtain the mean value of the detected value roughly from the maximum value and the minimum value. The output from the thermal resistor is such a non-linear output as its inclination is larger at the lower air flow and its inclination is smaller at the higher air flow, and even if the pulsation waveform approximately close to the sinusoidal waveform is detected as shown in FIG. 4, its output waveform has a sharp part at the lower air flow and a flat part at the higher air flow, and hence, it is difficult to estimate the actual mean value only from the maximum value and the minimum value.

DESCRIPTION OF THE PREFERRED EMBODIMENTS

Embodiments of the present invention will be described in detail by referring to the following drawings.

Figure 16:
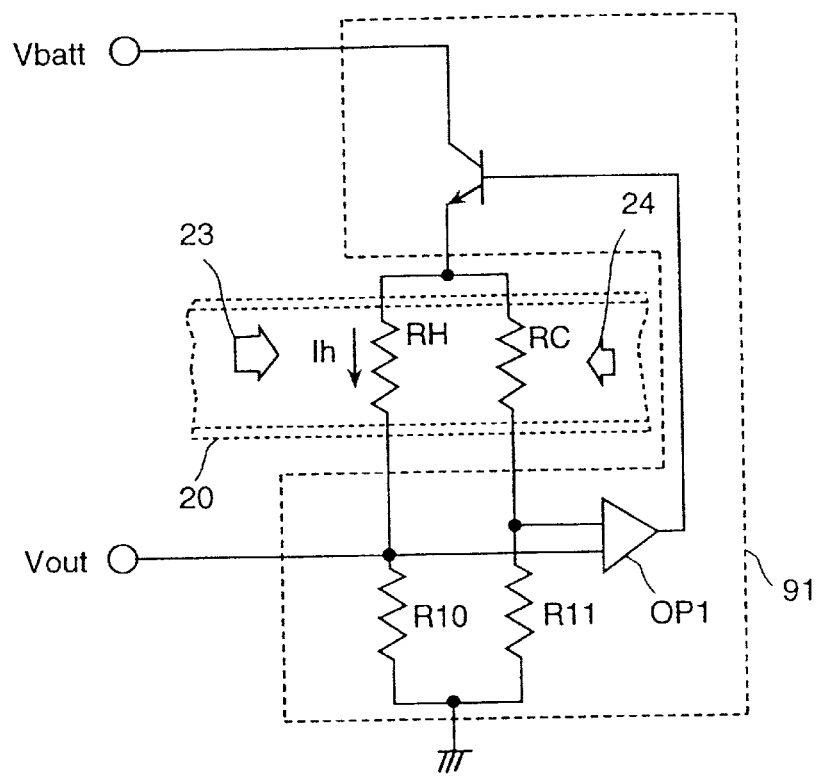
FIG. 16 is a schematic circuit structure of the thermal resistor type air flow measuring apparatus.

At first, the principle of the operation of the thermal resistor type air flow measuring apparatus is described. FIG. 16 shows a schematic diagram of the circuit structure of the thermal resistor type air flow measuring apparatus. The drive circuit 91 of the thermal resistor type air flow measuring apparatus is mainly composed of a bridge circuit and a feedback circuit. A bridge circuit is formed by the thermal resistor 3RH for measuring the intake air flow, the thermo-sensitive resistor 4RC and the resistors R10 and R11, and the output signal V2 corresponding to the air flow is obtained by passing the heating current Ih through the thermal resistor 3RH so as to maintain a constant temperature difference between the thermal resistor 3RH and the thermo-sensitive resistor 4RC and by applying a feedback operation with the operational amplifier OP1. In case that the air flow velocity is high, as the heat quantity removed from the thermal resistor 3RH is large, the heating current Ih to be passed is taken to be higher. In contrast, in case that the air flow velocity is high, as the heat quantity removed from the thermal resistor 3RH is small, the heating current Ih is required to be small. As the heat quantity removed from the thermal resistor 3RH is constant for either of the forward flow or the reverse flow and the heating current Ih is passed even for the reverse flow, an excess detection error occurs in the thermal resistor type air flow measuring apparatus.

Figure 17:
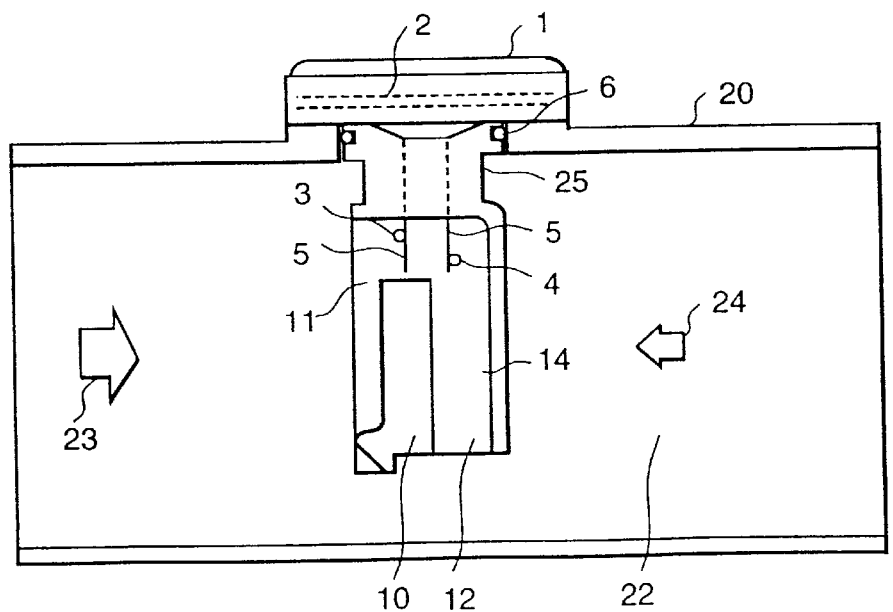
FIG. 17 is a vertical cross-section view of the thermal resistor type air flow measuring apparatus.
Figure 18:
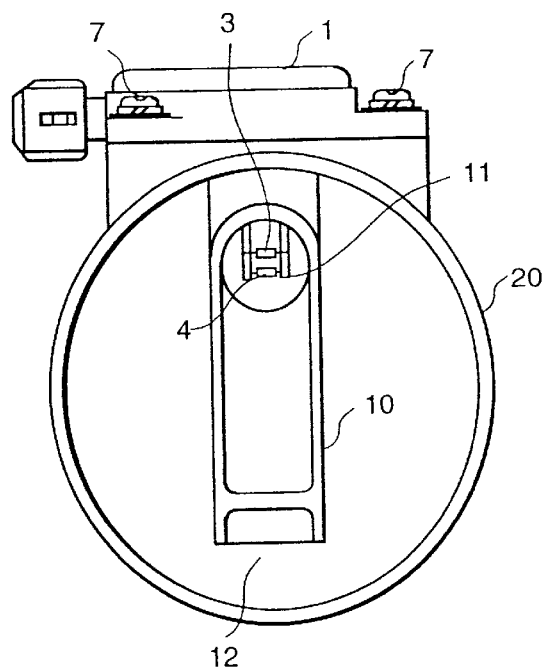
FIG. 18 is a projected view of FIG. 17 from the upper stream side.

FIG. 17 shows an vertical cross-section view showing an embodiment of the thermal resistor type air flow meter, and FIG. 18 shows its outside view projected from its upper stream side (left side).

The components of the thermal resistor type air flow measuring apparatus include a housing member 1 containing the circuit board 2 forming the drive circuit, and the auxiliary air passage composition member 13 formed with non electric conductive materials and so on. In the auxiliary air passage composition member 10, the thermal resistor 3 for detecting the air flow and the thermo-sensitive resistor 4 for compensating the intake air temperature are placed so as to be made electrically contacted to the circuit board 2 through the supporting member 5 formed with electric conductive material, and a single module for the thermal resistor type air flow measuring apparatus is so formed as to contain the housing, the circuit board, the auxiliary air passage and the thermal resistor and the thermo-sensitive resistor and so son. In addition, a hole 25 is formed on the wall of the main air passage composition member forming the intake pipe route, and the auxiliary air passage part of the thermal resistor type air flow measuring apparatus is inserted into the hole 25 from outside and the wall of the auxiliary air passage composition member and the housing member 1 are fixed by the screw 7 in order to establish mechanical strength. The main air passage part into which the auxiliary air passage is inserted is almost a cylinder tube, and the effective cross-sectional are for the air flow in the main air passage is almost identical at the positions of the entrance and outlet of the auxiliary air passage. A seal member 6 are inserted between the auxiliary air passage composition member 10 and the main air passage composition member in order to keep airtightness.

Next, the concrete aspects of the present invention are described.

Figure 1:
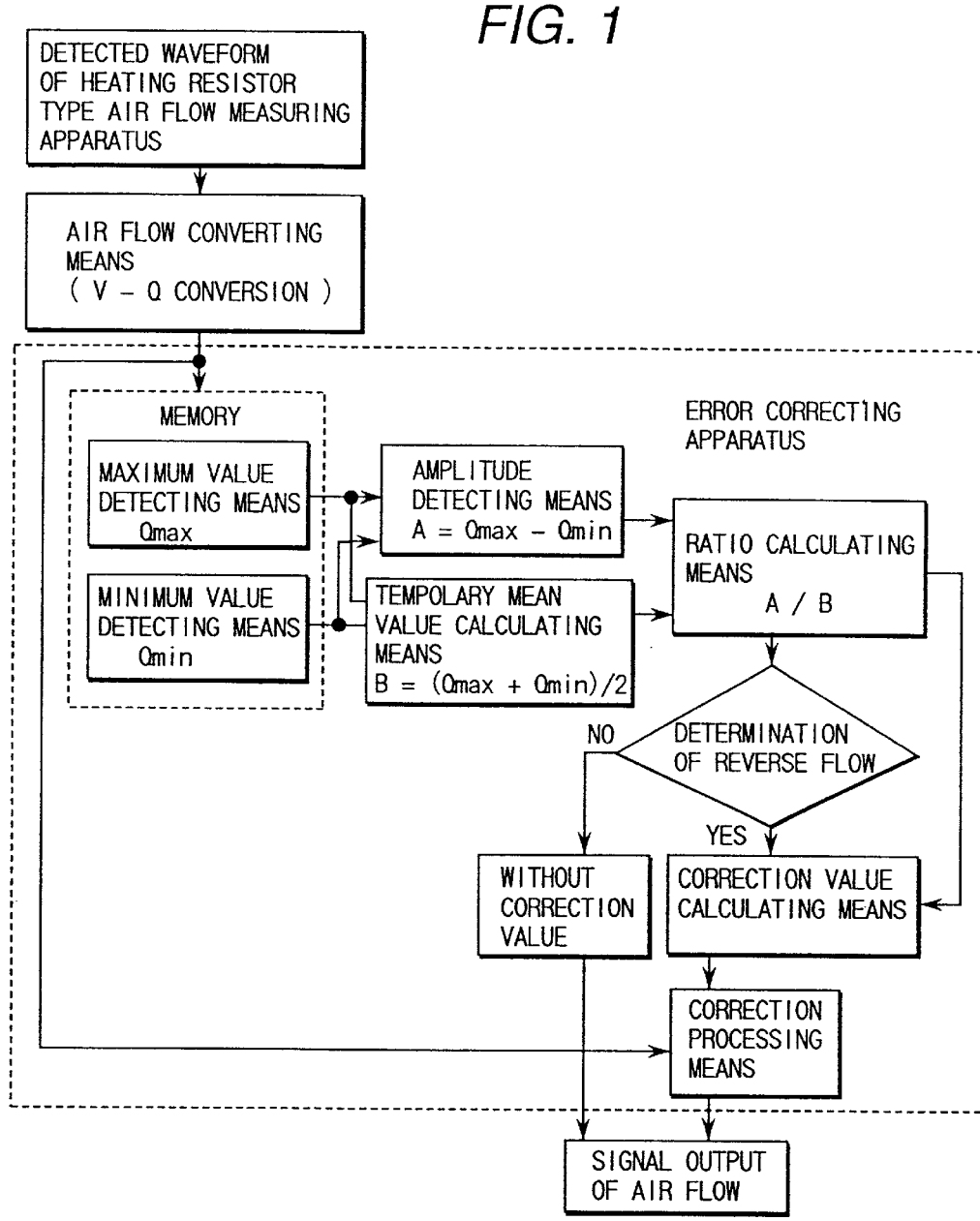
FIG. 1 is a block diagram showing the schematic structure of the present invention.

At first, FIG. 1 shows an example of the basic concept of the present invention. The error correction apparatus has a memory for detecting the maximum value, the minimum value and the mean value including the error due to the reverse flow from the detected waveform in the thermal resistor type air flow measuring apparatus and storing temporarily those values for a given period of time, a amplitude detecting means, a amplitude ration detecting means, a correction value estimating means, a reverse flow existence judging means and a correcting means for correcting the values based on the information supplied by the above mentioned means. Assuming that the minimum number of rotations of the engine at which the reverse flow occurs is 750 rpm, as the period of the pulsation waveform is about 40 ms, the duration time for storing the corrected data into the memory is required to be 40 ms or longer. In order to detect the reverser flow correctly, the sampling period for the data to be stored in the memory is determined to be 2 ms or shorter and thus,the number of sampled data is preferably 20 or more so that the values around the extremal values such as the maximum value and the minimum value may not be lost. Next, the amplitude of the pulsating air flow is obtained by using the maximum value (Qmax) and the minimum value (Qmin) stored in the memory, and the temporary mean value (Qmax+Qmin)/2 is obtained. The assumption that (Qmax+Qmin)/2 can be used as a temporary mean value is based on the fact that the pulsation waveform is approximately a sinusoidal wave in case that a massive pulsation operation arises with a reverse flow. Though it is essentially preferable that the mean value should be an average (integrated) value over a designated time period, as the incremental and real-time estimation of the average value gives higher processing load, the value of (Qmax+Qmin)/2 is alternatively used. Next, the ratio of the amplitude of the pulsation signal to the mean value is obtained. In this embodiment, the ratio is defined as the value obtained by dividing the amplitude of the pulsation signal by the mean value. Next, based on the ratio obtained above, whether a reverse flow exists in the intake pipe is judged. In this judgment, using a threshold value for the ratio, in case that the amplitude of the pulsation signal exceeds this threshold value, it is judged that there exists a reverse flow, and in case that the amplitude of the pulsation signal is smaller than this threshold value, it is judged that there is no reverse flow. In case that it is judged that there is no reverse flow, the detected signal is supplied as an air flow signal without correction. In case that it is judged that there exists a reverse flow, the correction value corresponding to the ratio is calculated and the pulsation signal added with this correction value is supplied as an air flow signal.

Figure 2:
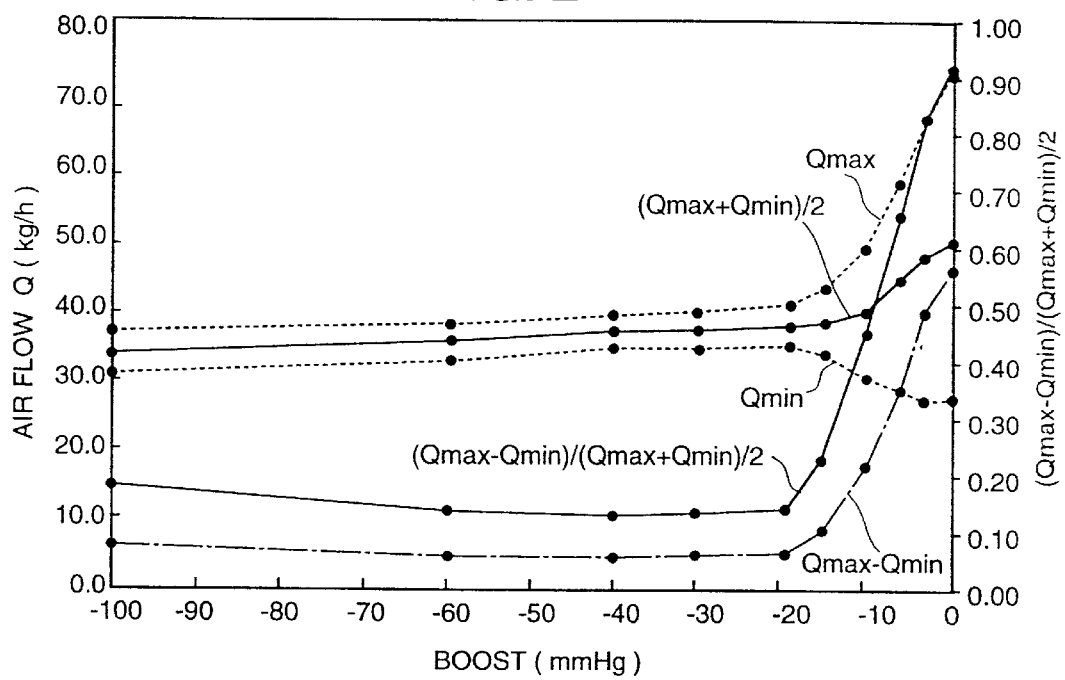
FIG. 2 is a graph figured with the maximum value and the minimum value detected by the thermal resistor in the bend route and with combined values with those extremal values.

A mechanism with which the method described in FIG. 1 is established is described with the experimental data. FIG. 2 shows a graph containing the maximum value (Qmax) and the minimum value (Qmin) of the pulsation waveform detected by the thermal resistor when opening gradually the throttle valve and changing the intake negative pressure (BOOST) at 10 points while the engine speed is kept constant. In FIG. 2, other than Qmax and Qmin themselves, what are plotted include (Qmax+Qmin)/2 as a temporary mean value, (Qmax−Qmin) as an amplitude value and ((Qmax−Qmin)/( (Qmax+Qmin)/2)) as the ratio of the amplitude value to the temporary mean value. The thermal resistor used for measuring the values shown in FIG. 2 has a bend shaped in a letter L in the main air passage, and is placed in the auxiliary air passage into which the reverse flow, if any, does not penetrate directly. The average value increases in the operation area in which the reverse flow occurs, and the reason why the average value increases is that the minimum value does not change much but the maximum value increases much. The reason why the minimum value does not change much is that the thermal resistor is placed in the auxiliary air passage into which the reverse flow, if any, does not penetrate directly.

According to FIG. 2, though the pulsation amplitude is very small in case that the intake negative pressure is −20 mmHg or less, in other cases, the pulsation amplitude becomes large as the intake negative pressure increases and thus, the ratio of the pulsation amplitude to the mean value also increases. Though a relation that the increase in the pulsation amplitude is equivalent to the occurrence of the reverse flow is proved, in the actual condition, there may be a case that the number of rotations of the engine is not identical for the same pulsation amplitude, in which the judgment only on the basis of the pulsation amplitude may make an incorrect detection of the reverse flow. Therefore, the above described incorrect detection may be avoided by detecting the ratio of the pulsation amplitude to the mean air flow. Thus, in the present invention, the judgment of the existence of the reverse flow and the value correction are made by means of the value obtained by dividing the pulsation amplitude by the mean value, that is, ((Qmax−Qmin)/((Qmax+Qmin)/2)).

Figure 3:
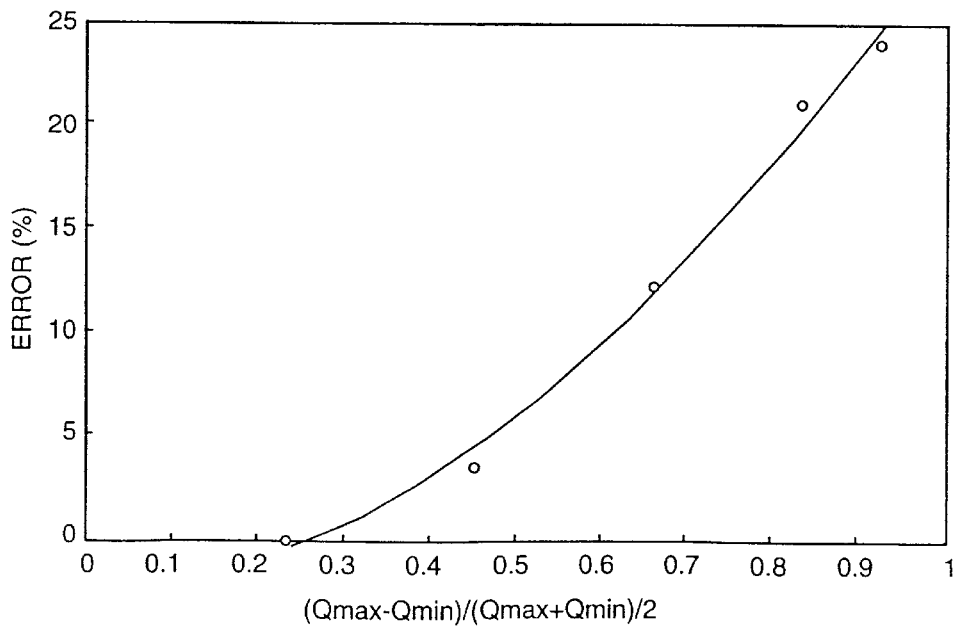
FIG. 3 is a graph showing a relation between the pulsation amplitude divided by the mean value and the detection error.

FIG. 3 is a graph in which the horizontal axis represents the value obtained by dividing the pulsation amplitude by the mean value by using the values in FIG. 2, and the vertical axis represents the error (ERROR) between the detected air flow detected by the thermal resistor and the actual air flow. According to FIG. 3, when the value obtained by dividing the pulsation amplitude by the mean value is about 0.3 or larger, the detection error due to the reverse flow occurs. Using the value of 0.3 as a threshold value, it is judged that there is no reverse flow if the value obtained by dividing the pulsation amplitude by the mean value is 0.3 or smaller, and that there is a reverse flow if the value obtained by dividing the pulsation amplitude by the mean value is larger than 0.3. In case that there is a reverse flow, by correcting the measured value according to the correlation shown in FIG. 3, the error caused by the existence of the reverse flow can be reduced. As the threshold value, for example, 0.3 in the above case, changes due to the structure of the air passage, it is required to determine the threshold value on the basis of the actual structure of the air passage.

Figure 4:
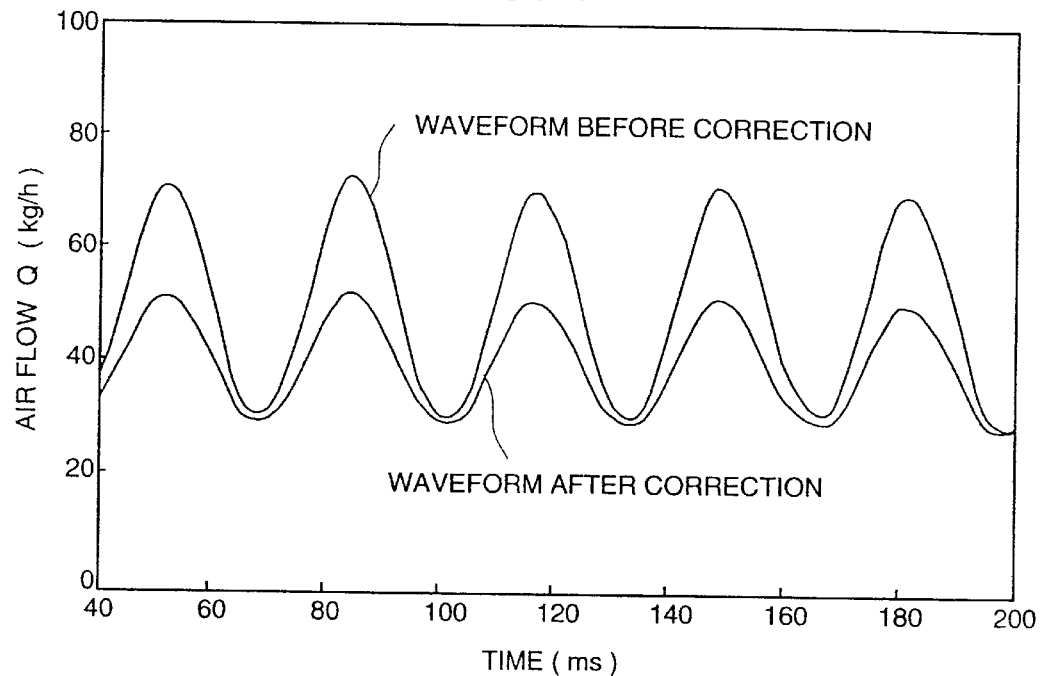
FIG. 4 is a graph showing waveforms before and after the correction so that the pulsation amplitude may be reduced while the minimum value is fixed as one example of the correcting method of the present invention.
Figure 5:
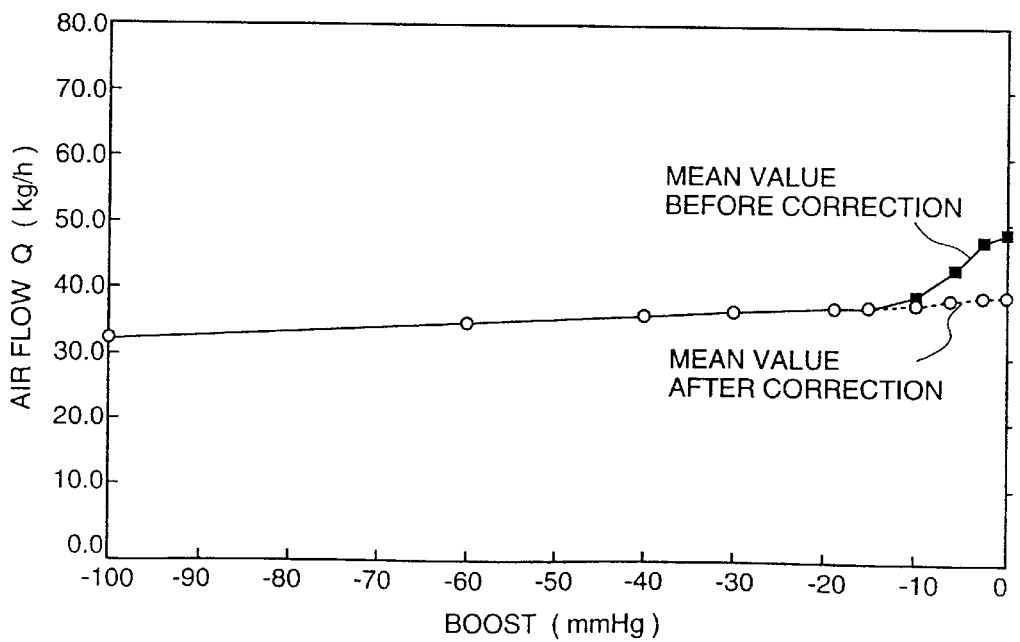
FIG. 5 is a graph showing an intake air signal vs. air flow signal relation before and after the correction, showing an effect of the present invention.

Next, one example of the correcting method is described by referring to FIG. 4 and FIG. 5. In FIG. 4 and FIG. 5, the waveforms before and after correction and the intake negative pressure vs. air flow characteristics in the present invention are shown. The values without correction in FIG. 5 are identical to the value for (Qmax+Qmin)/2 shown in FIG. 2. In the result of the study, using the maximum value and the minimum value in a designated time period stored as constant values in the memory, the correction is made so that the actual measured value may be reduced so much as the difference between the actual measured value and the minimum value becomes larger. For example, the time longer than a single cycle of the number of rotations of the engine is defined to be, for example, about 40 ms or longer if the number of idle rotations of the engine is 750 rpm, and about 50 ms or longer if the number of idle rotations of the engine is 600 rmp. This correction scheme is defined by the formula 1.

$$Q_{new} = Q_{samp} - k0(Q_{samp} - Q_{min})K1K2 \qquad (1)$$

where k0 is gain coefficient,

K1 is load coefficient, and

K2 is rotation number coefficient.

Qsamp in the formula 1 is the actual measured value, Qnew is the corrected value, Qmin is previously defined, and K1 and K2 are 1, respectively. The value for K0 is subject to the structure of the auxiliary air passage and thus, determined by experiments before hand. In this form of the formula 1, though the actual measured value near the minimum value is not much different from the corrected value, the value to be subtracted from the actual measured value becomes larger when the actual measured value is larger than the minimum value, and the value to be subtracted from the actual measured value has its maximum value when the actual measured value reaches the maximum value. Thus the mean value can be reduced as well as the pulsation amplitude can be reduced. In addition, according to the formula 1, in case that the minimum value does not change so much but the maximum value changes very much in responsive to the intake negative pressure as shown in FIG. 2, as the larger the maximum value, the larger the corrected value, the correction adaptive to the intake negative pressure can be established, and consequently, it is appreciated that the error caused by the reverse flow can be cancelled as shown in FIG. 5.

In the correcting method shown in this embodiment, the mean value is reduced in order to reduce the positive error caused by the reverse flow. In case of the non-linearity of the thermal resistor and the negative error (i.e. binary phenomena) caused by the pulsation amplitude but not leading directly to the reverse flow described in the problems to be solved by the present invention, for example, if the above described correction scheme is applied so that the maximum value may be fixed and the pulsation amplitude may be reduced, as the mean value increases inversely, then the negative error can be avoided. Thus, the correction means in this embodiment in which the maximum value and the minimum value are fixed and the pulsation amplitude is reduced can be applied not only to the reduction of the positive error due to the reverse flow but also to the reduction of the negative error.

Figure 6:
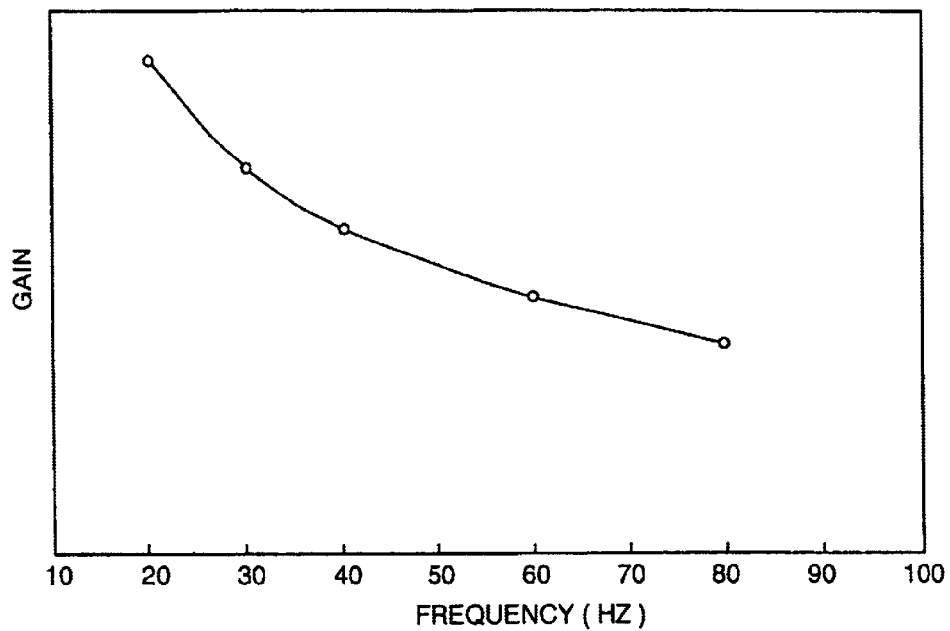
FIG. 6 is a frequency characteristic of the thermal resistor.

Next, the constant values K1 and K2 in the formula 1 are described. FIG. 6 is a graph showing an example of the frequency characteristic of the detecting sensitivity of the thermal resistor for the pulsation amplitude. Though the detecting sensitivity of the thermal resistor is high in the lower frequency, the detecting sensitivity decreases as the frequency becomes higher. Owing to this characteristic, the detected value of the pulsation amplitude is different from the actual value of the pulsation amplitude when the frequency changes.

In order to correct precisely the detected value in responsive to the engine speed, the correction scheme adaptive to the engine speed is required. As for the correction scheme adaptive to the engine speed, for example, in case that the correction is performed by the engine control unit (ECU) integrating the overall control of the engine, as the signal of the engine speed obtained by the engine speed sensor is captured in ECU, the correction in responsive to the frequency characteristic shown in FIG. 6 can be performed by using this captured signal. The correction coefficient for the engine speed is the coefficient K2 in the formula 1.

Figure 7:
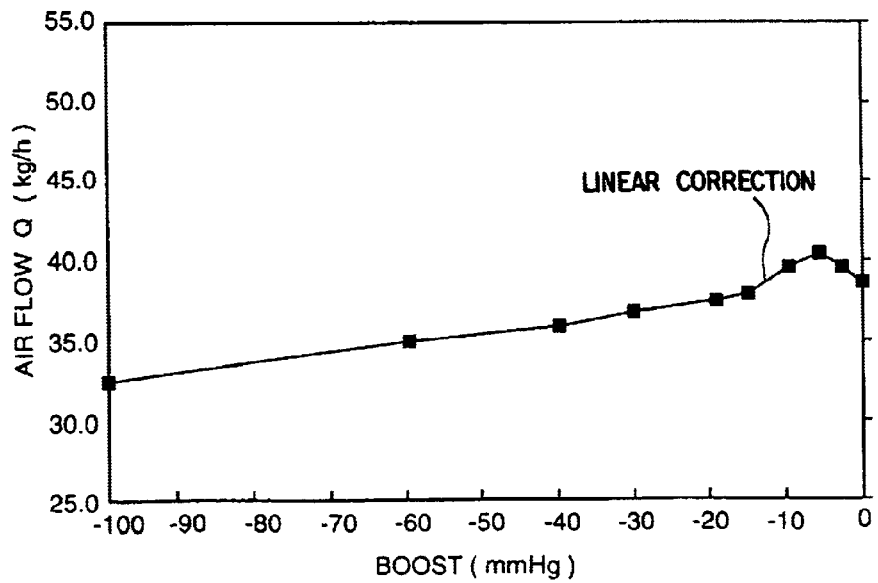
FIG. 7 is a characteristic graph showing a comparison of the correction operations using the linear approximation and the square/linear approximation with respect to the correction coefficient.
Figure 8:
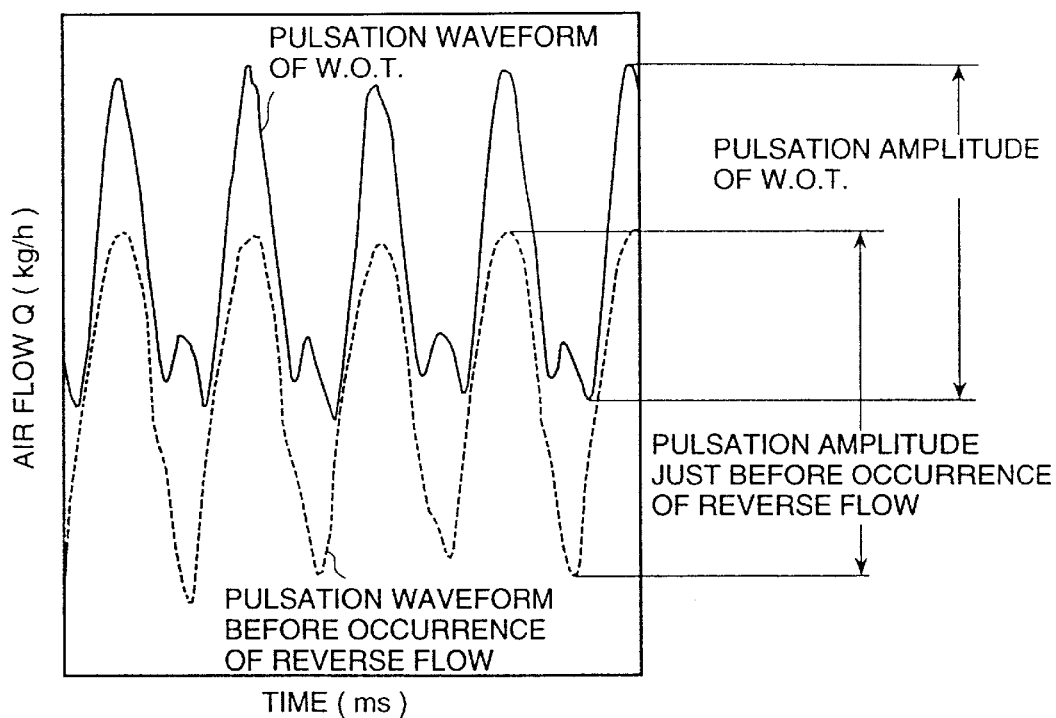
FIG. 8 is a waveform in case that the thermal resistor is placed in the main air passage.
Figure 9:
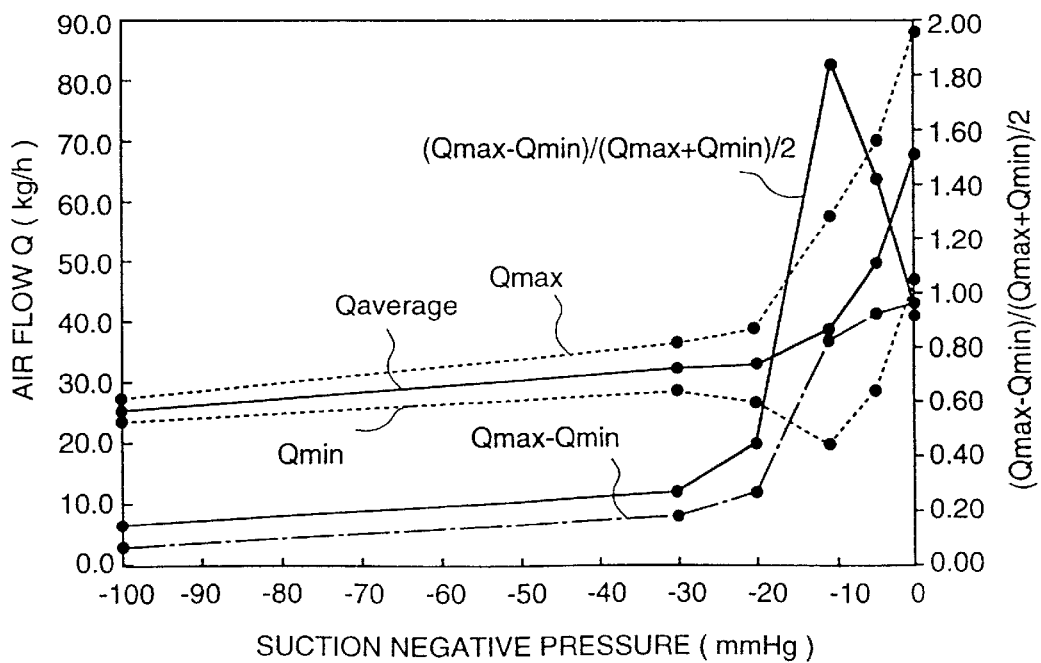
FIG. 9 is a characteristic graph figured with the maximum value and the minimum value detected by the thermal resistor in the main air passage and with combined values with those extremal values.

The relation between the ratio of the pulsation amplitude to the mean value ((Qmax−Qmin)/((Qmax+Qmin)/2)) and the detection error is not linear but can be approximated experimentally by a square function. By means that the engine load is detected by using the signals of the intake negative pressure and the opening of the throttle valve, and that the measure value is corrected with the square curve described in FIG. 3 in responsive to the engine load, the correction can be performed precisely. For comparison, the result of the correction by the linear approximation is shown in FIG. 7. As shown in FIG. 7, in the linear correction, the correction is not enough and the positive error remains in the area where the ratio of the pulsation amplitude to the mean value is small (near the occurrence of the reverse flow), and the correction is too much and the negative error occurs in the area where the ratio of the pulsation amplitude to the mean value is large. In contrast, what is shown in FIG. 5 is the case that the square approximation curve is used for correction. In this case, there is no positive and negative error, and good correction result can be obtained. The coefficient for the correction adaptive to the engine load is the coefficient K1 in the formula 1.

Figure 10:
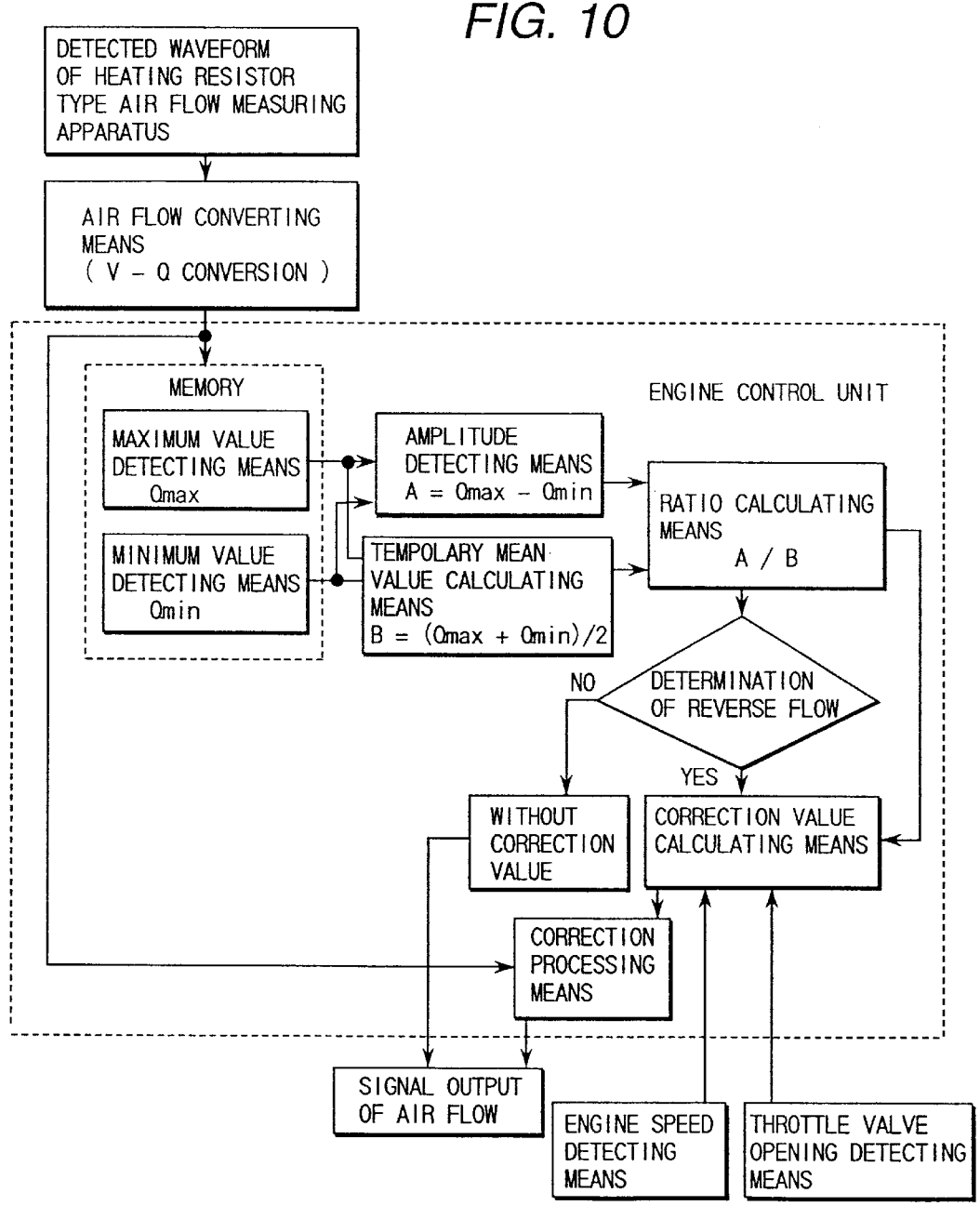
FIG. 10 is a block diagram showing a schematic structure in case of using the engine control unit as one embodiment of the present invention.

Also in this correction coefficient, K1, in case that the correction is performed by ECU, as the intake negative signal and the signal of the opening of the throttle valve are captured in ECU, the correction value can be obtained easily. In FIG. 10, what is shown is an example of the concept for correction of the measured value by using the above described engine control unit in the present invention. The correction scheme in FIG. 10 is basically the same as shown in FIG. 1, and specifically in FIG. 10, the engine speed and the opening of the throttle valve are detected and the correction value is calculated by using those signal values and the corrected air flow signal is put out.

Figure 11:
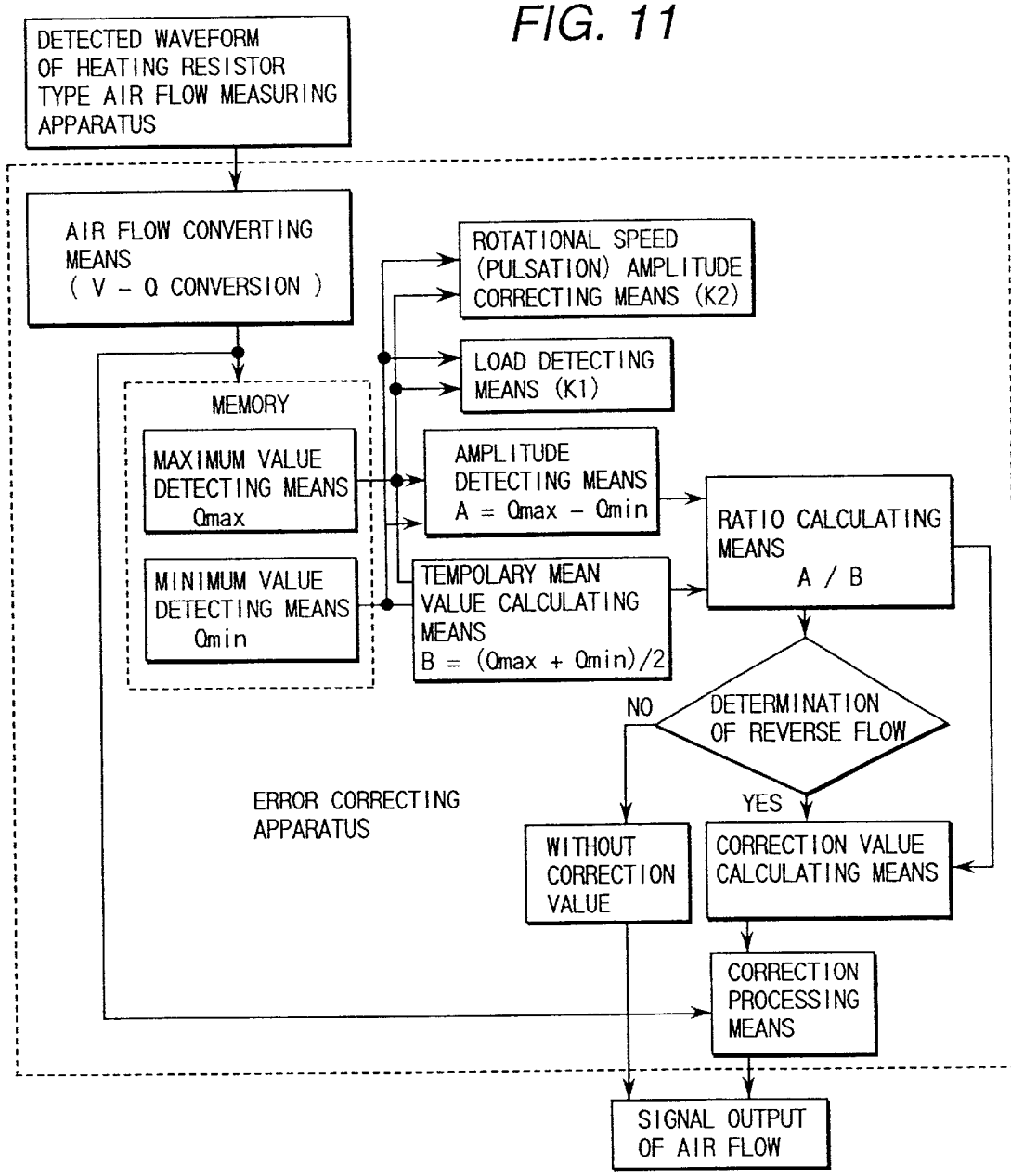
FIG. 11 is a block diagram showing a schematic structure in case of detecting the engine speed and the load state in the thermal resistor type air flow measuring apparatus as one embodiment of the present invention.

Next, an embodiment in which the correction in the present invention is performed by the thermal resistor type air flow measuring apparatus itself is described. FIG. 11 shows a concept of this embodiment. An error correction apparatus using microcomputers is mounted in the thermal resistor type air flow measuring apparatus, and used for performing the air flow conversion as well as storing the maximum value and the minimum value in the memory. And furthermore, the pulsation amplitude, the mean value and the rotational speed and the load are detected by using the maximum value and the minimum value, and the existence of the reverse flow is judged as well as the correction value is calculated and then the correction operation is performed and finally the corrected air flow signal is put out. As for the correction scheme, for example, what is applied is the correction scheme such as shown in FIG. 4 in which the pulsation amplitude is reduced while the minimum value is fixed. The detection means for detecting the load and the rotational speed is described below by referring to the formula 2.

$$Qnew = Qsamp - KO \times (Qsamp - Qmin) \times \left( \frac{\frac{Qmax - Qmin}{Qmax + Qmin}}{2} - S1 \right) \times \left( \frac{Qmax + Qmin}{2} \times \frac{1}{S2} \right) \quad (2)$$

in which S1 is a threshold value and S2 is the engine speed when setting the correction formula.

S1 in the formula 2 is a threshold value for judging the existence of the reverse flow. This value is defined around 0.3 according to the result shown in FIG. 3 in this embodiment. S2 shows the mean air flow at the engine speed when setting this correction formula, and is defined to be about 40 kg/h according to FIG. 5 in this embodiment. At first, the value corresponding to the load of K1 in the formula 1 is defined by subtracting the threshold value from the value obtained by dividing the pulsation amplitude by the mean value. With this value setting, the subtracting value can be increased as the pulsation amplitude increases. By means that the detected value is corrected by using the correlation defined expressed by the graph shown in FIG. 3 by a polynomial, the precision in the correction can be increased.

As for the value of K2 corresponding to the rotational speed, the ratio of the air flow when the correction is performed to the air flow when the correction formula is defined can tell the estimated value of the engine speed. Assuming that the engine speed is 800 rpm and the air flow is 40 kg/h when the correction formula is defined, and that the average value is detected to be 80 kg/h, the engine speed is estimated to be 1600 rpm. This estimation uses the proportional relation between the engine speed and the intake air flow.

As in the above description, even in case of using only the detected air flow detected by the thermal resistor, as the load state and the engine speed can be roughly recognized, it is appreciated that a thermal resistor type air flow measuring apparatus which corrects autonomously the error due to the reverse flow and supplies the corrected value can be provided.

Figure 12:
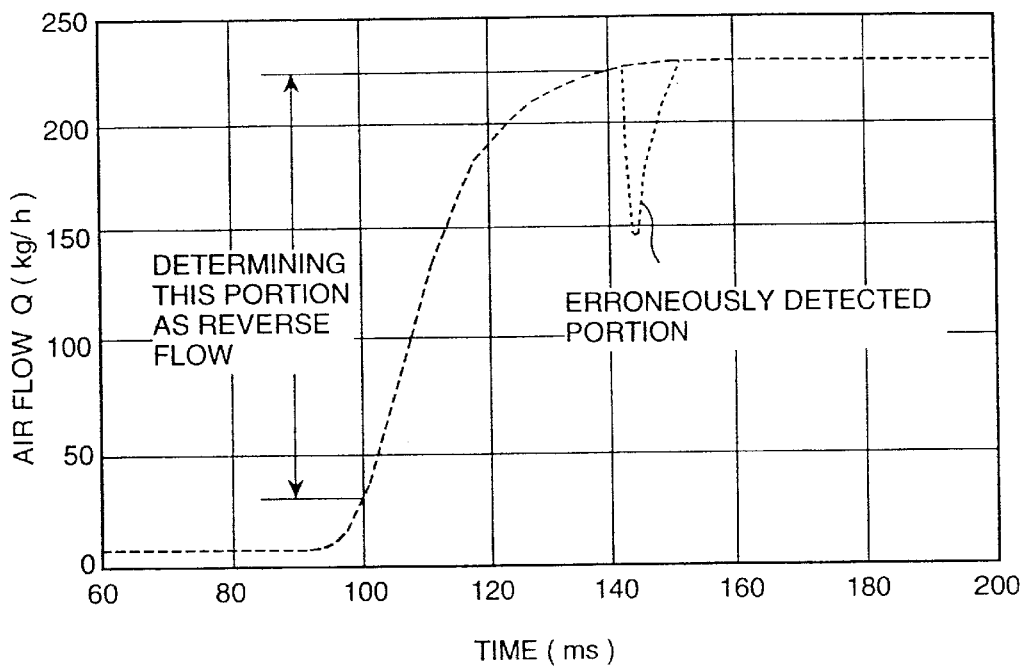
FIG. 12 is a characteristic graph showing an erroneous detection for the stepwise change in the air flow in the present invention.
Figure 13:
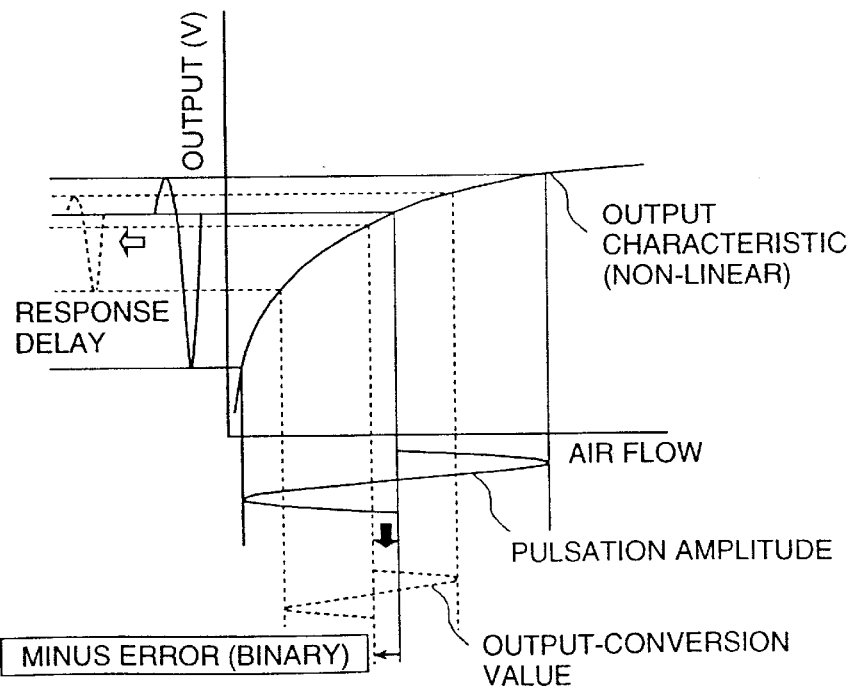
FIG. 13 is a mechanism showing a reduction (binary phenomena) of the output caused by the pulsation amplitude of the thermal resistor.
Figure 14:
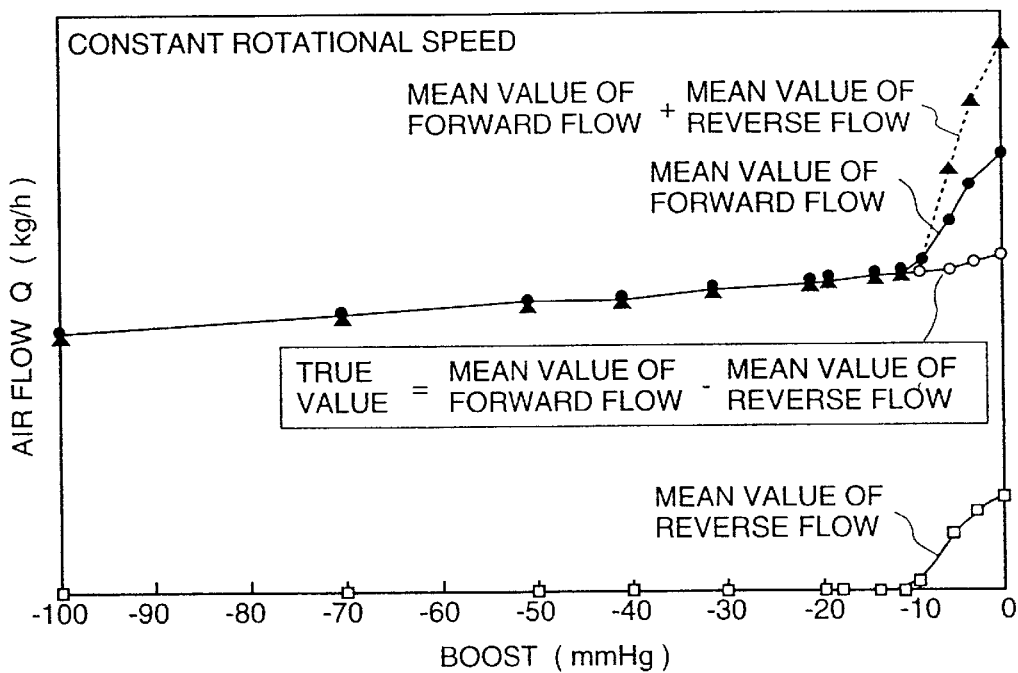
FIG. 14 is a characteristic graph showing the intake negative pressure on the horizontal axis and the mean air flow velocity on the vertical axis plotted with values obtained by measuring separately the forward air flow velocity and the reverse air flow velocity in the intake pipe.
Figure 15:
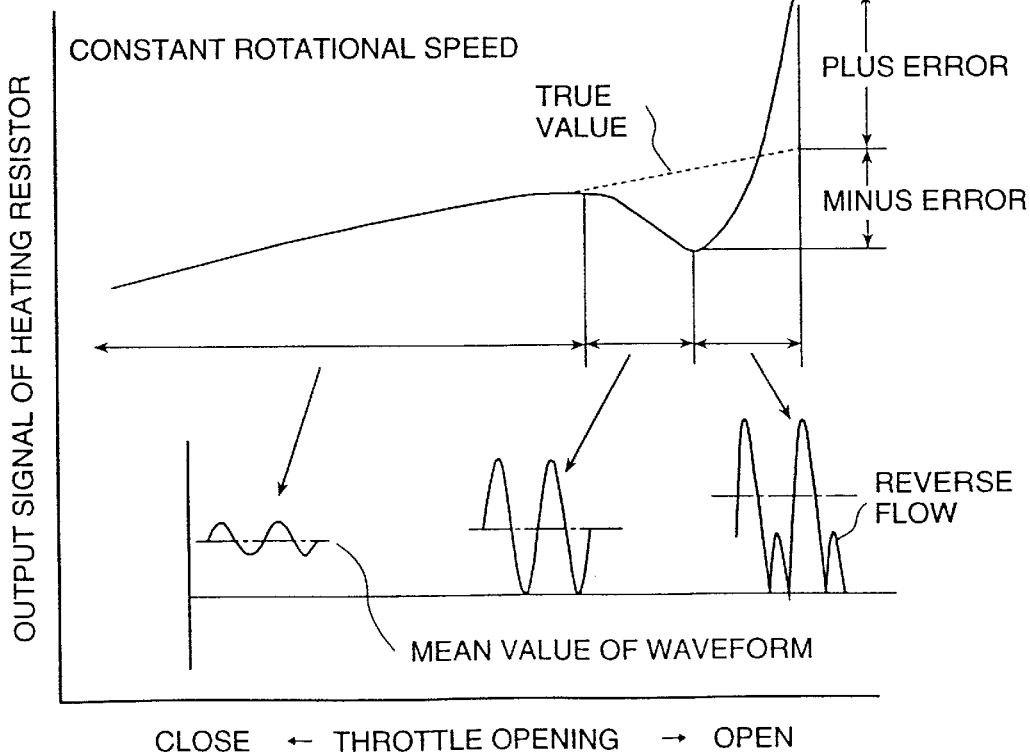
FIG. 15 is a characteristic graph showing a pulsation amplitude state for the individual intake negative pressure in the intake pipe.

As described above, though the above described correcting method can correct properly the error caused by the reverse flow, in case that there is no pulsation state and the air flow changed in a stepwise as shown in FIG. 12, the correcting method may perform an erroneous correction operation. This is because it is hard to judge whether the relation between the maximum value and the minimum value is caused by the stepwise change in the air flow or by the pulsation amplitude. This judgment problem can be resolved relatively easily in case that the correction is performed by the engine control unit. For example, by means that the correction operation is not performed by detecting the operation area in which the reverse flow does not occur apparently, using the engine speed signal and the throttle valve opening signal, the erroneous detection as shown in FIG. 12 can be avoided.

Also, in case that the thermal resistor type air flow measuring apparatus corrects autonomously the error due to the reverse flow and supplies the corrected value, by means that the correction operation is not performed by judging that the correction operation is required apparently with large amount for the output value to which the correction operation was applied previously, the erroneous detection as shown in FIG. 12 can be avoided. In the study result by the inventors, in case that the correction operation is not applied when the output difference of almost 10% or more occurs, the erroneous detection can be avoided even for the stepwise change in the air flow.

As described above, according to the present invention, it is appreciated that the measurement error of the thermal resistor type air flow measuring apparatus caused by the reverse flow in the intake pipe of the combustion engine can be reduced, and that the error correction for the influence of the pulsation can be established properly in the thermal resistor type air flow measuring apparatus using a highly reliable bypass route, and furthermore that the pulsation amplitude can be reduced small enough when the reverse flow occurs, and hence, the mean air flow can be easily calculated. As a result, a highly precise engine combustion control can be established.

Figure 19:
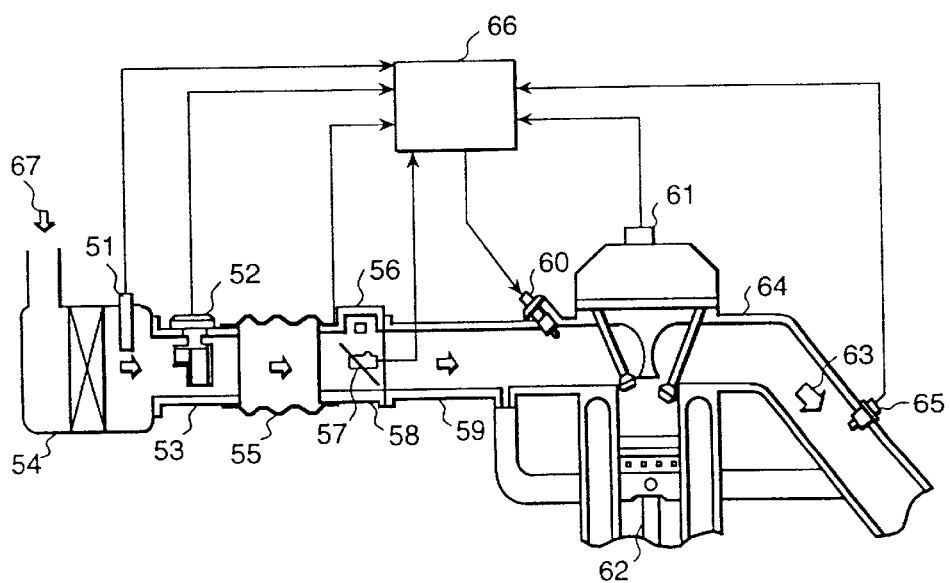
FIG. 19 is a system configuration of the internal combustion engine.

Finally, one embodiment in which the present invention is applied to the internal combustion engine using an electronic fuel injection method is described by referring to FIG. 19.

The intake air 67 taken in through the air cleaner 54 is led to the engine cylinder 62 through the body 53 of the thermal resistor type air flow measuring apparatus, the intake duct 55, the throttle body 58 and the intake manifold 59 having the injector 60 through which the fuel is supplied. The gas 63 generated in the engine cylinder is discharged through the exhaust manifold 64.

The air flow signal supplied from the circuit module 52 of the thermal resistor type air flow measuring apparatus, the intake air temperature signal from the temperature sensor, the throttle valve angle signal supplied from the throttle angle sensor 57, the oxygen density signal supplied from the oxygen density sensor 65 mounted on the exhaust manifold 64 and the engine speed signal supplied from the engine speed sensor 61 are supplied to the engine control unit 66, and the engine control unit 66 processes those signal values and determines the optimal fuel injection quantity and the optimal idle air control valve opening, and controls the injector 60 and the idol control valve 66 with those determined values.

According to the present invention, even in the existence of the pulsation flow to be taken into the automotive vehicle engine and accompanying the reverse flow, as the measurement error correcting method in the thermal resistor type air flow measuring apparatus for measuring highly precisely the air flow or the control apparatus can be provided, it is appreciated that the fuel combustion control for the engine can be performed highly precisely.

What is claimed is:

1. A thermal resistor type air flow measuring apparatus, comprising
   an auxiliary air passage arrangeable in an intake air passage of an internal combustion engine and having at least one bend;
   a thermal resistor arrangeable in said auxiliary air passage; and
   a judging means for judging the existence of a reverse flow in said intake air passage based on a maximum value and a minimum value of an air flow signal value obtained by said thermal resistor.

2. A thermal resistor type air flow measuring apparatus of claim 1, wherein
   a correcting means for correcting said air flow signal in the event that said judging means judges an existence of a reverse flow.

3. A thermal resistor type air flow measuring apparatus of claim 2, wherein
   said correction means corrects serially a detected waveform at every sampling of data and increments a mean air flow for a single period of pulsation.

4. A thermal resistor type air flow measuring apparatus of claim 3 wherein
   a correction is not performed in case that a air flow change about 10% or more occurs for a corrected value in a previous time.

5. A thermal resistor type air flow measuring apparatus of claim 2, wherein
   said correction means decreases a correction quantity near one of a maximum value and a minimum value of a detected waveform, and increases a correction quantity as close to another one.

6. A thermal resistor type air flow measuring apparatus of claim 5 wherein
   a correction for reducing a mean air flow for a single cycle of an intake stroke of said internal combustion engine is made by means that a correction quantity near a minimum value of said detected waveform is made smaller, and a correction quantity as closer to a maximum value is made larger, and a pulsation amplitude is made smaller.

7. A thermal resistor type air flow measuring apparatus of claim 2, further comprising
   means for obtaining said maximum value and said minimum value from air flow signal values in a designated time period which exceeds a period of an idle rotational speed of said internal combustion engine.

8. A thermal resistor type air flow measuring apparatus of claim 2, further comprising
   a means for obtaining said maximum value and said minimum value from air flow signal values in a designated time period changeable in response to an intake stroke period of said internal combustion engine.

9. A thermal resistor type air flow measuring apparatus of claim 2, wherein
   said judging means judges the existence of a reverse flow based on a value F, where $F=$ said maximum value−said minimum value)/((said maximum value+said minimum value)/2).

10. A thermal resistor type air flow measuring apparatus of claim 1, further comprising
    means for obtaining said maximum value and said minimum value from air flow signal values in a designated time period which exceeds a period of an idle rotational speed of said internal combustion engine.

11. A thermal resistor type air flow measuring apparatus of claim 1, further comprising
    a means for obtaining said maximum value and said minimum value from air flow signal values in a designated time period, wherein changeable in response to an intake stroke period of said internal combustion engine.

12. A thermal resistor type air flow measuring apparatus of claim 1, wherein
    said judging means judges the existence of a reverse flow based on a value F, where $F=$ said maximum value−said minimum value)/((said maximum value+said minimum value)/2).

13. A control apparatus for an internal combustion engines, comprising
    a thermal resistor type air flow measuring apparatus of claim 1; and
    a control apparatus for controlling a quantity of fuel supplied to said internal combustion engine based on a signal from said thermal resistor type air flow measuring apparatus.

14. A thermal resistor type air flow measuring apparatus, comprising
    an auxiliary air passage arrangeable in an intake air passage of an internal combustion engine and having at least one bend;
    a thermal resistor placed in said auxiliary air passage; and
    a correcting means for correcting a measurement error due to a reverse flow generated in said intake air passage based on a maximum value and a minimum value of an air flow signal value obtained by said thermal resistor.

15. A thermal resistor type air flow measuring apparatus of claim 14, wherein
    said correcting means corrects said measurement error based on a value F defined by a formula, $F=$(said maximum value−said minimum value)/((said maximum value+said minimum value/2).

16. A thermal resistor type air flow measuring apparatus of claim 14, further comprising
    means for obtaining said maximum value and said minimum value from air flow signal values in a designated time period which exceeds a period of an idle rotational speed of said internal combustion engine.

17. A thermal resistor type air flow measuring apparatus of claim 14, further comprising
    a means for obtaining said maximum value and said minimum value from air flow signal values in a designated time period changeable in response to an intake stroke period of said internal combustion engine.

18. A control apparatus for an internal combustion engines, comprising
    a judging means for judging the existence of a reverse flow in an air passage to be measured in a thermal resistor type air flow measuring apparatus based on a maximum value and a minimum value of an air flow signal value supplied from said thermal resistor type air flow measuring apparatus.

19. A control apparatus for an internal combustion engine, comprising
  a correcting means for correcting a measurement error due to a reverse flow in a air passage to be measured in a thermal resistor type air flow measuring apparatus based on a maximum value and a minimum value of an air flow signal value supplied from said thermal resistor type air flow measuring apparatus.

20. A reverse flow judging method of a thermal resistor type air flow measuring apparatus having
  an auxiliary air passage in an intake air passage of an internal combustion engine and having at least one bend; and
  a thermal resistor in said auxiliary air passage, comprising the steps of
    detecting a maximum value and a minimum value of an air flow signal value from said thermal resistor; and
    judging the existence of a reverse flow in said intake air passage based on said detected maximum value and said detected minimum value.

21. An error correcting method of a thermal resistor type air flow measuring apparatus having
  an auxiliary air passage in an intake air passage of an internal combustion engine and having at least one bend; and
  a thermal resistor in said auxiliary air passage, comprising the steps of
    detecting a maximum value and a minimum value of an air flow signal value from said thermal resistor; and
    determining a measurement error due to a reverse flow of a fluid to be measured by the thermal resistor type air flow measuring apparatus based on said detected maximum value and said detected minimum value.

* * * * *